3,329,649
CROSS LINKING OF CRYSTALLINE POLYMERS WITH SULFUR AND A POLYHALOALIPHATIC COMPOUND
Peter E. Wei and John Rehner, Jr., Westfield, N.J., assignors to Esso Research and Engineering Company, a corporation of Delaware
No Drawing. Filed Dec. 28, 1962, Ser. No. 247,803
11 Claims. (Cl. 260—41)

This invention relates to polymers or copolymers cured by sulfur and a polyhaloaliphatic compound, the present application being a continuation-in-part of S.N. 177,179, filed Mar. 5, 1962.

It has heretofore been known to vulcanize high unsaturation rubber, such as natural rubber, with sulfur and certain mild accelerators such as guanidine derivatives and thiazole derivatives. Low unsaturation rubbers have been vulcanized with somewhat greater difficulty by the use of sulfur, zinx oxide and accelerators or greater activity, such as thiuram derivatives and dithiocarbamates.

Additionally it has been shown in copending S.N. 177,179 that it is possible to formulate a vulcanizing mixture which will cure not only high unsaturation and low unsaturation elastomers but, surprisingly, elastomers of no unsaturation as well. More specifically, it has been found that elastomers and especially saturated elastomers may be cured with sulfur and a polyhaloaliphatic compound of the class consisting of polyhaloalkanes and polyhalocyclomonoalkenes. This is particularly surprising in view of the fact that sulfur in combination with polyhalocyclodiolefins will not cure many kinds of elastomers, such as saturated elastomeric polymers.

It has now been found that sulfur and a polyhaloaliphatic compound will cure (cross link) crystalline polymers as well as amorphous or rubbery polymers. This cross linking of polymers is desirable since, for example, it produces a product which has greater resistance to heat and greater resistance to solvation by oils or oil based solvents. Among the crystalline polymers contemplated by this invention are crystalline $C_2$–$C_5$ homopolymers and copolymers such as polyethylene, polypropylene and polyethylene-polypropylene block copolymers. These are all alpha olefin hydrocarbon polymers.

In particular, to 100 parts of polymer is added between about 0.1 to 10 parts by weight of sulfur, preferably 0.5 to 5 parts by weight, and about 0.2 to 30 parts by weight of the polyhaloaliphatic compound, preferably 0.5 to 10 parts by weight. The resulting mixture is then heated to yield a cured or cross linked product. To further improve the process, zinc oxide, various fillers, and metallic accelerators, such as $FeCl_3$, may be added to the mixture. Furthermore, improved results may also be obtained by masterbatching the polymer and the polyhaloaliphatic compounds of this invention prior to curing.

The polymers to which the present invention is applicable inculde high unsaturation rubbers such as natural rubber, polybutadiene, nitrile rubber (a copolymer of acrylonitrile and butadiene), SBR (a copolymer of styrene and butadiene), and polychloroprene (a homopolymer of 2-chloro-butadiene-1,3). The invention is also applicable to low unsaturation rubbers such as butyl rubber (a copolymer of a major portion of a $C_4$–$C_7$ isoolefin with a minor portion of a $C_4$–$C_{10}$ multiolefin), and chlorobutyl (chlorinated butyl rubber). Finally, and most surprisingly, elastomers and crystalline polymers of no unsaturation may be cured by the present invention. These include Vistanex (polyisobutylene) and the low pressure, substantially amorphous copolymers of ethylene and other alpha olefins. The copolymers thus include $C_3$ to $C_5$ alpha olefins such as propylene, 1-butene, and 1-pentene. Propylene is particularly preferred as the other alpha olefin. The process for producing these low pressure copolymers is generally described in the literature, e.g., see U.K. Patent 856,736, "Scientific American," September 1957, pages 98 et seq., and page 6 of copending application Ser. No. 116,938, filed June 14, 1961. The invention is also applicable to amorphous or crystalline $C_2$–$C_5$ alpha olefins homopolymers such as polyethylene and polypropylene, to blends of various of the above listed polymers, and to copolymers containing more than two kinds of monomers, such as terpolymers and tetrapolymers. Finally it is to be noted that the use of mineral-filled or oil-extended polymers will yield an improved product.

The polyhaloaliphatic compounds which may be used in this invention include the polyhaloalkanes and the polyhalocyclomonoalkenes. By polyhaloalkanes is meant $C_1$–$C_{20}$ alkanes which have been substituted with halogen to such an extent that they contain not more than one hydrogen atom per molecule. Representative examples of these compounds include $CCl_4$, $CHCl_3$, hexachloroethane, heptachloropropane, octachloropropane, the bromine and iodine analogs of these compounds, and compounds of mixed halogenation such as dichloro-dibromomethane. Especially preferred are hexachloroethane, heptachloropropane, and octachloropropane.

The polyhalomonoalkenes which may be used in this invention include cyclomonoolefins which contain between 3 and 20 ring carbon atoms and which have been substituted with halogen atoms to such an extent that they contain not more than one hydrogen atom per molecule. Especially preferred of this group is octachlorocyclopentene.

Other polyhaloaliphatic compounds which may be used include the $C_3$ to $C_{20}$ cycloalkanes which have been halogenated to such an extent that they include no more than 1 hydrogen atom per molecule.

It is desirable in this invention to further include zinc oxide in the curing mixture in an amount of from 0 to 20 parts per 100 parts of polymer.

Fillers are also desirable and a variety of carbon blacks, clays, silicas, and whitings may be used. Best results are obtained with semi-reinforcing or highly reinforcing furnace and channel carbon blacks such as those designated commercially as SAF, SRF, HAF, EPC, and MPC types of carbon blacks. The amount of filler used can be from 0 to 200 parts by weight, but preferably 20 to 70 parts per 100 parts of elastomer is used.

The metallic accelerators which are useful in this invention include metals, inorganic metallic compounds, and metallic salts of carboxylic acids. Preferred substances are aluminum powder, the metal halides, oxides, sulfides, ammonium sulfates and the metallic salts of alkyl mono- and dicarboxylic acids. Especially preferred are iron oxide (ferrous and ferric), iron chloride, aluminum chloride, iron "octasol" (iron 2-ethyl-hexoate) and iron di-stearate. These substances may be present in amounts of about 0.0001 to 10 parts by weight, preferably 0.05 to 5 parts. These accelerators, it is to be noted, have surprisingly greater effectiveness when the zinc oxide is absent from the curing mixture.

The cross linking of the polymers may be effected by thorough contacting of the polymer with a curing mixture, e.g., on a rubber mill, or in a Banbury mixer, and subjecting the resulting mixture to temperatures of 250 to 450° F., preferably 280 to 400° F., for from 1 to 180 minutes, preferably 1 to 90 minutes.

A more preferred method is to mix the polymer and curing agent with or without sulfur or other additives in a masterbatch and then simply heat the resulting composition of matter to a curing temperature as needed (other additives may be mixed with the masterbatch just prior to heating). The advantages of producing the cross-linked product in this manner include the following: (1) mixing time is reduced, (2) the addition of the curing agent to the masterbatch lowers the Mooney viscosity of the mixture and thereby facilitates the processing of the polymer.

This invention and its advantages will be better understood by reference to the following examples. The data of S.N. 177,179 are repeated herein as the curing of certain elastomers is analogous to the cross linking of crystalline polymers.

Example 1

The elastomeric ethylene-propylene copolymers were vulcanized with the use of octachloropropane. Details and results are given in the following table. In this and the following tables the parts are by weight per 100 parts of polymer.

|  | 1 | 2 | 3 | 4 |
|---|---|---|---|---|
| EP Rubber, F-3616 [a] | 100 | 100 |  |  |
| EP Rubber, MD-460 [b] |  |  | 100 | 100 |
| HAF Carbon Black | 50 | 50 | 50 | 50 |
| Sulfur | 2 | 2 | 2 | 2 |
| Zinc Oxide | 2 |  | 2 |  |
| Iron Tallate [c] |  | 5 |  | 5 |
| Octachloropropane | 5 | 5 |  | 5 |
| Cured Properties: |  |  |  |  |
| 30'/250° F.— |  |  |  |  |
| Tensile, p.s.i |  | 870 | [d] | [d] |
| Elong., percent |  | 100 | [d] | [d] |
| 30'/280° F.— |  |  |  |  |
| Tensile, p.s.i | 410 | 2,640 | [d] | 1,900 |
| Elong., percent | 680 | 680 | [d] | 730 |
| 30'/300' F.— |  |  |  |  |
| Tensile, p.s.i | 500 | 3,480 | [d] | 2,430 |
| Elong., percent | 800 | 650 | [d] | 650 |
| 30'/320° F.— |  |  |  |  |
| Tensile, p.s.i | 660 | 3,500 | <100 | 2,520 |
| Elong., percent | 850 | 600 | 900 | 600 |
| 30'/335° F.— |  |  |  |  |
| Tensile, p.s.i | 970 | 3,830 | 110 | 2,750 |
| Elong., percent | 800 | 580 | 900 | 600 |
| 60'/335° F.— |  |  |  |  |
| Tensile, p.s.i | 1,770 | 3,730 | (?) | 2,690 |
| Elong., percent | 750 | 500 | (?) | 580 |

[a] Ethylene-propylene copolymer made with $VCl_3/Al(C_6H_{13})_3$. Contains 49 mole percent propylene units; intrinsic viscosity, 5.2 in decalin at 135° C.; 93 Mooney.
[b] Ethylene-propylene copolymer made with $VOCl_3/AlEtCl_2$. Contains 58 mole percent propylene units; intrinsic viscosity, 3.93 in decalin at 135° C.; 45 Mooney.
[c] Iron "Nuolate" (6% Fe, Nuodex Products Co.), an iron salt of tall oil.
[d] Not cured.

Example 2

Various inorganic metal salts were utilized as accelerators for the vulcanization of elastomeric ethylenepropylene copolymers with octachlorocyclopentene used as the vulcanizing agent. As can be seen from the following table, these agents are highly effective accelerators.

|  | A | B | C | D | E | F | G |
|---|---|---|---|---|---|---|---|
| EP Rubber, F-4734 [a] | 100 | 100 | 100 | 100 | 100 | 100 | 100 |
| EP Rubber, MD-460 [b] |  |  |  |  |  |  |  |
| HAF Carbon Black | 50 | 50 | 50 | 50 | 50 | 50 | 50 |
| Sulfur | 1 | 1 | 1 | 1 | 1 | 1 | 1 |
| Zinc Oxide | 2 | 2 | 2 | 2 | 2 | 2 | 2 |
| Octachlorocyclopentene | 5 | 5 | 5 | 5 | 5 | 5 | 5 |
| Inorganic Metal Salt | None | $AlCl_3$ | $FeCl_3$ | $FeCl_3.6H_2O$ | $SnCl_4.5H_2O$ | $ZnCl_2$ | $CaCl_2$ |
| PHR |  | 5 | 5 | 5 | 5 | 5 | 5 |
| Cure: 60 minutes at 335° F.— |  |  |  |  |  |  |  |
| Tensile, p.s.i | 310 | 2,260 | 2,360 | 2,500 | 1,750 | 1,890 | 1,500 |
| Elongation, percent | 900 | 550 | 350 | 480 | 650 | 780 | 650 |

|  | H | I | J | K | L | M | N |
|---|---|---|---|---|---|---|---|
| EP F-4734 Rubber, [a] | 100 | 100 |  |  |  |  |  |
| EP Rubber, MD-460 [b] |  |  | 100 | 100 | 100 | 100 | 100 |
| HAF Carbon Black | 50 | 50 | 50 | 50 | 50 | 50 | 50 |
| Sulfur | 1 | 1 | 2 | 2 | 2 | 2 | 2 |
| Zinc Oxide | 2 | 2 | 2 | 2 | 2 | 2 | 2 |
| Octachlorocyclopentene | 5 | 5 | 5 | 5 | 5 | 5 | 5 |
| Inorganic Metal Salt | $BaCl_2.2H_2O$ | $CoCl_2.6H_2O$ | None | $FeCl_2.4H_2O$ | $HgCl_2$ | $AlBr_3$ | $FeNH_4(SO_4)_2$ |
| PHR | 5 | 5 |  | 5 | 5 | 5 | 5 |
| Cure: 60 minutes at 335° F.— |  |  |  |  |  |  |  |
| Tensile, p.s.i | 1,190 | 1,000 | 360 | 2,240 | 1,720 | 1,530 | 2,000 |
| Elongation, percent | 780 | 580 | 1,000+ | 480 | 700 | 600 | 650 |

[a] Ethylene-propylene copolymer, which contains 30 mol percent propylene units; inherent viscosity of 2.9 in decalin at 135° C.
[b] Ethylene-propylene copolymer, which has been deashed and contains Ethyl Antioxidant 702; contains 58% by mole of propylene units; inherent viscosity of 3.93 in decalin at 135° C.

Example 3

Various organic metal salts are shown to be effective accelerators for the vulcanization of a rubbery ethylene-propylene copolymer with octachlorocyclopentene used as the vulcanizing agent. Details and results are as follows:

|  | A | B | C | D | E | F | G |
|---|---|---|---|---|---|---|---|
| EP Rubber, MD-460 [a] | 100 | 100 | 100 | 100 | 100 | 100 | 100 |
| HAF Carbon Black | 50 | 50 | 50 | 50 | 50 | 50 | 50 |
| Sulfur | 2 | 2 | 2 | 2 | 2 | 2 | 2 |
| Zinc Oxide | 2 | 2 | 2 | 2 | 2 | 2 | 2 |
| Octachlorocyclopentene | 5 | 5 | 5 | 5 | 5 | 5 | 5 |
| Organic Metal Salt | None | Iron naphthenate | Iron octasol | Iron distearate | Iron nuolate | Iron octoate | Iron oxalate |
| PHR |  | 5 | 5 | 5 | 5 | 5 | 5 |
| Cure: 60 Minutes at 335° F.— |  |  |  |  |  |  |  |
| Tensile, p.s.i | 360 | 2,520 | 3,000 | 3,120 | 2,160 | 2,390 | 1,950 |
| Elongation, percent | 1,000+ | 600 | 700 | 650 | 680 | 550 | 580 |
| Cure: 6 Minutes at 400° F.— |  |  |  |  |  |  |  |
| Tensile, p.s.i | 1,200 | 2,050 | 2,930 | 2,980 | 1,790 | 2,120 | 2,240 |
| Elongation, percent | 930 | 500 | 750 | 600 | 580 | 550 | 500 |

|  | H | I | J | K | L | M | N |
|---|---|---|---|---|---|---|---|
| EP Rubber, MD-460 [a] | 100 | 100 | 100 | 100 | 100 | 100 | 100 |
| HAF Carbon Black | 50 | 50 | 50 | 50 | 50 | 50 | 50 |
| Sulfur | 2 | 2 | 2 | 2 | 2 | 2 | 2 |
| Zinc Oxide | 2 | 2 | 2 | 2 | 2 | 2 | 2 |
| Octachlorocyclopentene | 5 | 5 | 5 | 5 | 5 | 5 | 5 |
| Organic Metal Salt | Aluminum stearate | Aluminum octoate | Aluminum laurate | Cobalt naphthenate | Manganese naphthenate | Lead stearate | Cerium naphthenate |
| PHR | 5 | 5 | 5 | 5 | 5 | 5 | 5 |
| Cure: 60 Minutes at 335° F.— |  |  |  |  |  |  |  |
| Tensile, p.s.i | 2,080 | 850 | 1,350 | 1,440 | 590 | 1,090 | 710 |
| Elongation, percent | 1,000 | 850 | 950 | 780 | 1,000 | 1,000+ | 1,000+ |
| Cure: 6 Minutes at 400° F.— |  |  |  |  |  |  |  |
| Tensile, p.s.i | 2,400 | 2,500 | 2,590 | 1,960 | 1,960 | 2,030 | 1,880 |
| Elongation, percent | 700 | 580 | 650 | 650 | 650 | 950 | 750 |

[a] Ethylene-propylene copolymer, which has been deashed and contains Ethyl Antioxidant 702; contains 58 mole percent propylene units; inherent viscosity of 3.93 in decalin at 135° C.

Example 4

The concentration effect of ferric chloride, a typical accelerating agent, is shown in the following table:

|  | A | B | C | D |
|---|---|---|---|---|
| EP Rubber, MD-460 HM [a] | 100 | 100 | 100 | 100 |
| HAF Carbon Black | 50 | 50 | 50 | 50 |
| Sulfur | 2 | 2 | 2 | 2 |
| Zinc Oxide | 2 | 2 | 2 | 2 |
| Octachlorocyclopentene | 5 | 5 | 5 | 5 |
| FeCl₃ (anhydrous) | None | 0.05 | 0.1 | 1.0 |
| Cure: 60 Minutes at 335° F.— |  |  |  |  |
| Tensile, p.s.i | 1,100 | 2,720 | 3,400 | 3,160 |
| Elongation, percent | 930 | 700 | 720 | 480 |

[a] Ethylene-propylene rubber, which was deashed and contained Ethyl Antioxidant 702; contained 58 mole percent propylene units with inherent viscosity of 4.26 as determined in decalin at 135° C.

Example 5

Miscellaneous metal compounds as accelerators for octachlorocyclopentene vulcanization are shown to be effective in the following table. It is to be noted that these accelerators have a much greater effect when zinc oxide is absent from the curing mixture (compare run F with runs C or D).

|  | A | B | C | D | E | F | G | H | I | J | K | L |
|---|---|---|---|---|---|---|---|---|---|---|---|---|
| EP Rubber, MD-460 [a] | 100 | 100 | 100 | 100 | 100 | 100 | 100 | 100 | None | None | None | None |
| EP Rubber, F-4723 [b] | None | None | None | None | None | None | None | None | 100 | 100 | 100 | 100 |
| HAF Carbon Black | 50 | 50 | 50 | 50 | 50 | 50 | 50 | 50 | 50 | 50 | 50 | 50 |
| Sulfur | 2 | 2 | 2 | 2 | 2 | 2 | 2 | 2 | 1 | 1 | 1 | 1 |
| Zinc Oxide | 2 | None | None | None | None | 2 | 2 | 2 | 2 | 2 | 2 | 2 |
| Octachlorocyclopentene | 5 | 5 | 5 | 5 | 5 | 5 | 5 | 5 | 5 | 5 | 5 | 5 |
| Metal Compound | None | None | Iron oxide | Iron oxide | None | Iron oxide | TiO₂ | So₂S₅ | None | Al₂O₃ | Aluminum Iso-propoxide | Aluminum powder |
| PHR |  |  | 5 | 5 |  | 5 | 5 | 5 |  | 5 | 5 | 5 |
| Tall Oil [c] | None | None | None | 5 | 5 | None | None | None | None | None | None | None |
| Cure: 30 mins. at 307° F.— |  |  |  |  |  |  |  |  |  |  |  |  |
| Tensile, p.s.i |  |  | 1,500 | 2,500 | 0 |  |  |  |  |  |  |  |
| Elongation, percent |  |  | 750 | 700 | 0 |  |  |  |  |  |  |  |
| Cure: 30 mins. at 320° F.— |  |  |  |  |  |  |  |  |  |  |  |  |
| Tensile, p.s.i |  | Not cured | 2,870 | 2,630 | 50 |  |  |  |  |  |  |  |
| Elongation, percent |  |  | 500 | 580 | 100 |  |  |  |  |  |  |  |
| Cure: 60 mins. at 335° F.— |  |  |  |  |  |  |  |  |  |  |  |  |
| Tensile, p.s.i | 360 | Not cured | 2,600 | 2,690 | <100 | 1,260 | 710 | 1,060 | 310 | 810 | 1,050 | 1,050 |
| Elongation, percent | 1,000+ |  | 350 | 600 | 350 | 950 | 1,000+ | 1000 | 900 | 680 | 850 | 700 |

[a] Ethylene-propylene copolymer, which contains 58 mole percent propylene units with inherent viscosity of 3.93 and contains Ethyl Antioxidant 702 and has been deashed.
[b] Contains no antioxidant and has 70 mole percent ethylene units in the rubber with inherent viscosity of 2.62 as determined in decalin at 135° C. and has not been deashed.
[c] From Arizona Chemical Co. with trade name of "Acintol FA #1," which contains less than 0.001% ash; 4% rosin acid; 4% unsaponifiables; 92% fatty acids (contains conjugated linoleic acid, 8%; unconjugated linoleic acid, 36%; oleic acid, 50%; saturated acids, 6%). ASTM D803 tests=acid No. 191; saponification No. 195; Iodine No. 135; specific gravity, 0.9065.

Example 6

In the following example the effect of various non-black fillers is shown in the vulcanization of rubbery ethylene-propylene copolymers.

propylene copolymers prepared by a solution process is shown in the following table:

|  | A | B | C | D | E |
|---|---|---|---|---|---|
| Composition Synthesis: [a] |  |  |  |  |  |
| (1) EP Rubber Solution [b] F-4723, g | 500 | 500 | 500 | 500 | 500 |
| (2) Octachlorocyclopentene, g | 1 | 2 | 15 | 30 | 100 |
| (3) Sodium Stearate, g | 0.3 | 0.3 | 0.3 | 0.3 | 0.3 |
| (4) Product, Dry Rubber, g | 27.5 | 27.0 | 40.5 | 51.5 | 113.5 |
| (5) Octachlorocyclopentene in Product (Based on amount used), percent | 3.64 | 11.11 | 37.04 | 58.25 | 88.11 |
| Analysis: |  |  |  |  |  |
| (6) Chlorine Found in Product, wt. percent | 2.61 | 6.58 | 31.17 | 39.85 | 62.06 |
| (7) Equivalent Octachlorocyclopentene, wt. percent | 3.16 | 7.97 | 37.75 | 48.26 | 75.15 |
| Compounding—Composition, 100; HAF Carbon Black, 50; Sulfur, 2; Zinc Oxide, 2: |  |  |  |  |  |
| Cure: 30 minutes at 335° F.— |  |  |  |  |  |
| Tensile, p.s.i | 190 | 440 | 2,130 | -------- | -------- |
| Elongation, percent | 700 | 1,000+ | 280 | -------- | -------- |
| Cure: 60 minutes at 335° F.— |  |  |  |  |  |
| Tensile, p.s.i | 400 | 2,690 | 1,780 | -------- | -------- |
| Elongation, percent | 1,000+ | 600 | 130 | -------- | -------- |
| Cure: 60 minutes at 320° F.— |  |  |  |  |  |
| Tensile, p.s.i | 190 | 470 | 2,230 | -------- | -------- |
| Elongation, percent | 1,000+ | 1,000+ | 250 | -------- | -------- |
| Cure: 6 minutes at 400° F.— |  |  |  |  |  |
| Tensile, p.s.i | 1,520 | 2,610 | 1,730 | -------- | -------- |
| Elongation, percent | 900 | 300 | <100 | -------- | -------- |
| Dilution of Composition with EP Rubber: |  |  |  |  |  |
| (8) Corresponding Composition, g |  |  | 20 | 9.1 | 3.2 |
| (9) Pure EP Rubber, F-4723, g |  |  | 80 | 90.9 | 96.8 |
| (10) Equivalent Octachlorocyclopentene (wt. percent) |  |  | (7.5) | (4.3) | (2.4) |
| Compounding—Diluted Composition, 100; HAF Carbon Black, 50; Sulfur, 2; Zinc Oxide 2: |  |  |  |  |  |
| Cure: 30 minutes at 335° F.— |  |  |  |  |  |
| Tensile, p.s.i |  |  | 360 | 240 | 260 |
| Elongation, percent |  |  | 1,000+ | 1,000+ | 1,000+ |
| Cure: 60 minutes at 335° F.— |  |  |  |  |  |
| Tensile, p.s.i |  |  | 1,730 | 840 | 530 |
| Elongation, percent |  |  | 980 | 1,000+ | 1,000+ |
| Cure: 60 minutes at 320° F.— |  |  |  |  |  |
| Tensile, p.s.i |  |  | 330 | 260 | 240 |
| Elongation, percent |  |  | 1,000+ | 1,000+ | 1,000+ |
| Cure: 6 minutes at 400° F.— |  |  |  |  |  |
| Tensile, p.s.i |  |  | 3,160 | 2,650 | 1,540 |
| Elongation, percent |  |  | 550 | 660 | 1,000+ |

[a] The rubber solution and octachlorocyclopentene were mixed thoroughly and then added into one liter of hot water at about 180° F. with stirring. This temperature was maintained until all the solvent had been practically stripped off so as to produce a workable rubber mass. The rubber mass was sheeted out and dried in air at room temperature.

[b] The EP rubber solution was a hexane solution of ethylenepropylene copolymer which contained 30 mole percent propylene units with an inherent viscosity of 2.4 as determined in decalin at 135° C.

|  | A | B | C | D |
|---|---|---|---|---|
| EP Rubber, MD-460 [a] | 100 | -------- | -------- | -------- |
| EP Rubber, MD-460 HM [b] | -------- | 100 | 100 | 100 |
| HiSil/233 [c] | 50 | 50 | -------- | -------- |
| Dixie Clay [d] | -------- | -------- | 50 | -------- |
| Zeolex 7A [e] | -------- | -------- | -------- | 50 |
| Sulfur | 2 | 2 | 2 | 2 |
| Zinc Oxide | 2 | 2 | 2 | 2 |
| Octachlorocyclopentene | 5 | 5 | 5 | 5 |
| FeCl₃ (anhydrous) | None | 0.2 | 0.2 | 0.2 |
| Calcium Stearate | -------- | 1 | 1 | 1 |
| Cure: 60 minutes at 335° F. |  |  |  |  |
| Tensile, p.s.i | 3,200 | 3,960 | 1,980 | 2,620 |
| Elongation, percent | 740 | 650 | 900 | 700 |

[a,b] Both of these rubbers were ethylene-propylene copolymers and had 58 mole percent propylene units in the rubber, but differed in inherent viscosity: [a] 3.93; [b] 4.26 as determined in decalin at 135° C.
[c] A commercial rubber grade of finely divided silica, manufactured by the Columbia-Southern Corporation.
[d] A commercial rubber grade of finely divided kaolin sold by the R. T. Vanderbilt Company.
[e] A commercial rubber grade of finely divided silica sold by the Huber Corporation.

Example 7

The preparation and vulcanization of compositions of matter comprising octachlorocyclopentene and ethylene-propylene copolymers prepared by a solution process is shown in the following table:

Example 8

The following table indicates that the addition of octachlorocyclopentene to ethylene-propylene rubber lowers the Mooney plasticity value of this composition of matter, thus rendering the product more readily processable in rubber manufacturing equipment.

| Parts of octachlorocyclopentene mixed into 100 parts of ethylene-propylene rubber: | Mooney plasticity (8 min./212° F.) |
|---|---|
| None (control) | 48 |
| 2 | 46 |
| 5 | 44 |
| 10 | 41 |
| 20 | 37 |
| 50 | 27 |
| 85 | 19 |

Example 9

The following table indicates the effectiveness of octachlorocyclopentene in cross linking high pressure polyethylene and amorphous polypropylene.

|  | A | B | C | D | E | F |
|---|---|---|---|---|---|---|
| Polyethylene a | 100 | 100 | 100 | None | None | None |
| Polypropylene b | None | None | None | 100 | 100 | 100 |
| HAF Carbon Black | 50 | 50 | 50 | 50 | 50 | 50 |
| Sulfur | 0 | 1 | 1 | 1 | 1 | 1 |
| Zinc Oxide | 0 | 2 | 2 | 2 | 2 | 2 |
| Octachlorocyclopentene | 0 | 0 | 10 | 0 | 3 | 10 |
| Cure: 30 mins. at 320° F.— |  |  |  |  |  |  |
| Tensile, p.s.i | 1,800 | 2,000 | 2,190 | \multicolumn{3}{l}{No cure—No sample} |
| Elongation, percent | <100 | <100 | 200 |  |  |  |
| Cure: 30 mins. at 335° F.— |  |  |  |  |  |  |
| Tensile, p.s.i | 1,790 | 1,850 | 2,270 | 780 | 1,820 | 1,950 |
| Elongation, percent | <100 | 200 | 200 | 0 | 580 | 600 |
| Cure: 60 mins. at 335° F.— |  |  |  |  |  |  |
| Tensile, p.s.i | 1,770 | 1,960 | 2,500 | 700 | 2,140 | 2,780 |
| Elongation, percent | <100 | 180 | 150 | 150 | 500 | 450 |
| Gel Content, percent c | 27 | 25 | 100 | 24.4 | 49.0 | 74.3 | a Bakelite Polyethylene (DYNH-3)—mixed on rubber mill at 200° F.
b Amorphous: molecular weight, 270,000.
c Determined by heating in decalin at 135° C. at 0.1% conc. for one hour, and then filtering through a 325 mesh screen and weighing the insoluble residue after drying.

*Example 10*

The high pressure polyethylene and amorphous polypropylene of Example 9 are shown to be curable with hexachloroethane. Details and results are as follows:

|  | A | B | C | D | E |
|---|---|---|---|---|---|
| Polyethylene a | 100 | 100 | 100 | None | None |
| Polypropylene b | None | None | None | 100 | 100 |
| HAF Carbon Black | 50 | 50 | 50 | 50 | 50 |
| Sulfur | 0 | 1 | 1 | 1 | 1 |
| Zinc Oxide | 0 | 2 | 2 | 2 | 2 |
| Hexachloroethane | 0 | 0 | 10 | 0 | 5 |
| Cure: 30 mins. at 320° F.— |  |  |  |  |  |
| Tensile, p.s.i | 1,820 | 2,000 | 1,950 | 0 | 1,470 |
| Elongation, percent | <100 | <100 | 180 | 0 | 150 |
| Cure: 30 mins. at 335° F.— |  |  |  |  |  |
| Tensile, p.s.i | 1,790 | 1,850 | 1,950 | 780 | 2,060 |
| Elongation, percent | <100 | 200 | 130 | 0 | 550 |
| Cure: 60 mins. at 335° F.— |  |  |  |  |  |
| Tensile, p.s.i | 1,770 | 1,960 | 1,950 | 700 | 2,280 |
| Elongation, percent | <100 | 180 | 100 | 150 | 550 |
| Gel Content, percent c | 27 | 25 | 97 | 24.4 | ——— | a Bakelite Polyethylene (DYNH-3)—mixed on rubber mill at 200° F.
b Amorphous: M.W., 270,000.
c Determined by heating in decalin at 135° C. at 0.1% conc. for one hour, and then filtering through a 325 mesh screen and weighing the insoluble residue after drying.

*Example 11*

In the following table, it is shown that octachlorocyclopentene will effectively vulcanize unsaturated rubbers such as butyl-SBR blends:

*Example 12*

In the following table, it is shown that octachlorocyclopentene is also useful for vulcanizing blends of butyl rubber with other rubbers.

|  | A | B | C | D | E | F | G | H | I | J |
|---|---|---|---|---|---|---|---|---|---|---|
| Butyl 218 a | 100 | 75 | 50 | 25 | None | 100 | 75 | 50 | 25 | None |
| SBR 1500 b | None | 25 | 50 | 75 | 100 | None | 25 | 50 | 75 | 100 |
| HAF Carbon Black | 50 | 50 | 50 | 50 | 50 | 50 | 50 | 50 | 50 | 50 |
| Sulfur | 2 | 2 | 2 | 2 | 2 | 2 | 2 | 2 | 2 | 2 |
| Octachlorocyclopentene | None | None | None | None | None | 5 | 5 | 5 | 5 | 5 |
| Cure: 30 mins. at 320° F.— |  |  |  |  |  |  |  |  |  |  |
| Tensile, p.s.i | 530 | 260 | 170 | 130 | 110 | 700 | 480 | 1,000 | 2,250 | 2,480 |
| Elongation, percent | 1,000+ | 600 | 650 | 700 | 600 | 630 | 400 | 250 | 330 | 450 |
| Cure: 60 mins. at 335° F.— |  |  |  |  |  |  |  |  |  |  |
| Tensile, p.s.i | 280 | 470 | 1,160 | 2,140 | 3,000 | 2,090 | 790 | 1,980 | 2,190 | 2,750 |
| Elongation, percent | 1,000+ | 400 | 280 | 380 | 550 | 430 | 150 | 100 | 150 | 200 | a A commercial grade of butyl rubber (an isobutylene-isoprene copolymer produced by the Enjay Chemical Company).
b A commercial type of butadiene-styrene copolymer.

|  | A | B | C | D | E | F |
|---|---|---|---|---|---|---|
| Butyl 218, g.[a] | 100 | 100 | 100 | 75 | 75 | 50 |
| Other rubber |  |  |  | Smoked sheet 25 | Smoked sheet 25 | Smoked sheet 50 |
| G |  | 50 | 50 | 50 | 50 | 50 |
| HAF Carbon Black | 50 | 50 | 50 | 50 | 50 | 50 |
| Sulfur | 2 | 2 | 2 | 2 | 2 | 2 |
| Zinc Oxide |  |  | 2 | 2 |  |  |
| Octachlorocyclopentene |  | 5 |  |  | 5 | 5 |
| Cure: 30 min. at 320° F.— |  |  |  |  |  |  |
| Tensile, p.s.i | 530 | 700 | 1,910 | 280 | 670 | 1,280 |
| Elongation, Percent | 100+ | 630 | 600 | 500 | 280 | 200 |
| Cure: 30 min. at 335° F.— |  |  |  |  |  |  |
| Tensile, p.s.i |  |  | 2,700 | 350 | 560 | 1,090 |
| Elongation, Percent |  |  | 530 | 700 | 250 | 200 |
| Cure: 60 min. at 335° F.— |  |  |  |  |  |  |
| Tensile, p.s.i | 280 | 2,090 |  |  |  |  |
| Elongation, Percent | 1,000+ | 430 |  |  |  |  |

|  | G | H | I | J | K | L | M |
|---|---|---|---|---|---|---|---|
| Butyl 218, g.[a] | 75 | 75 | 75 | 75 | 75 | 75 | 75 |
| Other Rubber | [b] Hypalon 40 | Hypalon 40 | [c] "cis-4" poly-butadiene | "cis-4" poly-butadiene | [d] Paracril C | Paracril C | [e] Neoprene W |
|  |  |  |  |  |  |  | 50 |
| G | 25 | 25 | 25 | 25 | 25 | 25 | 50 |
| HAF Carbon Black | 50 | 50 | 50 | 50 | 50 | 50 | 2 |
| Sulfur | 2 | 2 | 2 | 2 | 2 | 2 | 2 |
| Zinc Oxide | 2 | 2 | 2 | 2 |  | 2 | 2 |
| Octachlorocyclopentene |  |  |  |  |  |  |  |
| Cure: 30 min. at 320° F.— |  |  |  |  |  |  |  |
| Tensile, p.s.i | 580 | 570 | 290 | 870 | 770 | 1,000 | 1,660 |
| Elongation, Percent | 50 | 50 | 330 | 230 | 430 | 230 | 130 |
| Cure: 30 min. at 335° F.— |  |  |  |  |  |  |  |
| Tensile, p.s.i | 440 | 670 | 400 | 820 | 830 | 1,110 | 1,480 |
| Elongation, Percent | 0 | 0 | 400 | 150 | 250 | 130 | <100 |
| Cure: 60 min. at 335° F.— |  |  |  |  |  |  |  |
| Tensile, p.s.i |  |  |  |  |  |  |  |
| Elongation, Percent |  |  |  |  |  |  |  |

[a] A commercial grade of butyl rubber (an isobutylene-isoprene copolymer produced by the Enjay Chemical Company).
[b] A chlorosulfonated polyethylene (E. I. DuPont de Nemours Company).
[c] A commercial poly-cis 1,4-butadiene (Phillips Chemical Company).
[d] A commercial copolymer of butadiene and acrylonitrile (United States Rubber Company).
[e] A commercial polychloroprene (E. I. duPont de Nemours Company).

Example 13

In the following table, it is shown that chlorinated paraffin wax is not a vulcanizing agent for ethylene-propylene rubbery copolymers:

|  | A | B |
|---|---|---|
| EP Rubber, F-3616[a] | 100 | 100 |
| HAF Carbon Black | 50 | 50 |
| Sulfur | 1 | 1 |
| Zinc Oxide | 2 | 2 |
| Chlorowax[b] | None | 10 |
| Cure: 30 minutes at 320° F.— |  |  |
| Tensile Strength, p.s.i | 370 | 410 |
| Elongation, percent | 600 | 800 |
| Cure: 60 minutes at 335° F.— |  |  |
| Tensile Strength, p.s.i | 410 | 350 |
| Elongation, percent | 580 | 730 |

[a] 49 mole percent propylene units. Inherent viscosity of 5.7 as determined in decalin at 135° C. (Catalyst=VCl$_3$/Al(C$_6$H$_{13}$)$_3$)
[b] Diamond Alkali Company Chlorowax 70—a resinous chlorinated paraffin wax.

Example 14

In the following table, it is shown that perhalocyclopolyenes are not effective vulcanizing agents for ethylene-propylene rubber.

|  | A | B | C |
|---|---|---|---|
| EP Rubber, F-3616* | 100 | 100 | 100 |
| HAF Carbon Black | 50 | 50 | 50 |
| Sulfur | 1 | 1 | 1 |
| Zinc Oxide | 2 | 2 | 2 |
| Perhalocyclopolyene | None | [a] 10 | [b] 10 |
| Cure: 30 minutes at 280° F.— |  |  |  |
| Tensile, p.s.i | 370 | 560 | 470 |
| Elongation, percent | 600 | 600 | 780 |
| Cure: 30 minutes at 320° F.— |  |  |  |
| Tensile, p.s.i | 450 | 520 | 500 |
| Elongation, percent | 630 | 550 | 750 |
| Cure: 60 minutes at 335° F.— |  |  |  |
| Tensile, p.s.i | 410 | 650 | 500 |
| Elongation, percent | 580 | 450 | 730 |

[a] Hexachlorocyclopentadiene.
[b] Hexachlorobenzene.
*Ethylene-propylene rubber, which contains about 49 mole percent propylene units and has an inherent viscosity of 5.7 as determined in decalin at 135° C.; prepared with VCl$_3$/Al(C$_6$H$_{13}$)$_3$ complex catalyst.

Example 15

In the following table, it is shown that perhaloalkenes are not effective vulcanizing agents for ethylene-propylene rubber:

|  | A | B | C | D | E |
|---|---|---|---|---|---|
| EP Rubber, F-3616* | 100 | 100 | 100 | 100 | 100 |
| HAF Carbon Black | 50 | 50 | 50 | 50 | 50 |
| Sulfur | 1 | 1 | 1 | 1 | 1 |
| Zinc Oxide | 2 | 2 | 2 | 2 | 2 |
| Perhaloalkene | None | (a) | (b) | (c) | (d) |
| PHR | None | 10 | 10 | 10 | 10 |
| Cure: 30 mins. at 280° F.— |  |  |  |  |  |
| Tensile, p.w.i | 370 | 650 | 520 | 550 | 480 |
| Elongation, percent | 600 | 750 | 650 | 700 | 650 |
| Cure: 30 mins. at 320° F.— |  |  |  |  |  |
| Tensile, p.s.i | 450 | 660 | 630 | 600 | 330 |
| Elongation, percent | 630 | 780 | 400 | 750 | 650 |
| Cure: 60 mins. at 335° F.— |  |  |  |  |  |
| Tensile, p.s.i | 410 | 700 | 390 | 550 | 530 |
| Elongation, percent | 580 | 650 | 230 | 650 | 730 | a Tetrabromoethylene.
b Hexachloropropene.
c 1,1,2-trichloro-3,3,3-trifluoropropene.
d Hexachlorobutadiene.
*Ethylene-propylene rubber, which contains about 49 mole percent propylene units and has an inherent viscosity of 5.7 as determined in decalin at 135° C.; prepared with $VCl_3/Al(C_6H_{13})_3$ complex catalyst.

Example 16

In the following table, the effect of the number of hydrogen atoms in the polyhaloaliphatic molecule on the vulcanization of ethylene-propylene rubber is shown. As can be seen, only those molecules with no more than one hydrogen atom are effective.

|  | A | B | C | D | E | F | G |
|---|---|---|---|---|---|---|---|
| F-3616 EP Rubber* | 100 | 100 | 100 | 100 | 100 |  |  |
| CP-2 EP Rubber† |  |  |  |  |  | 100 | 100 |
| HAF Carbon Black | 50 | 50 | 50 | 50 | 50 | 50 | 50 |
| Sulfur | 1 | 1 | 1 | 1 | 1 | 2 | 2 |
| Zinc Oxide | 2 | 2 | 2 | 2 | 2 | 5 | 5 |
| Polyhaloaliphatic | None | (a) | (b) | (c) | (d) | None | (e) |
| PHR | None | 10 | 10 | 10 | 5.9 | None | 5 |
| Cure: 30 minutes at 280° F.— |  |  |  |  |  |  |  |
| Tensile, p.s.i | 370 | 630 | 630 | 590 | 390 | 710 | 370 |
| Elongation, percent | 600 | 650 | 750 | 780 | 650 | 600 | 480 |
| Cure: 30 minutes at 320° F.— |  |  |  |  |  |  |  |
| Tensile, p.s.i | 450 | 1,030 | 470 | 890 | 440 | 640 |  |
| Elongation, percent | 630 | 450 | 600 | 750 | 700 | 700 |  |
| Cure: 60 minutes at 335° F.— |  |  |  |  |  |  |  |
| Tensile, p.s.i | 410 | 1,050 | 900 | 1,110 | 390 |  | 320 |
| Elongation, percent | 580 | 450 | 600 | 600 | 630 |  | 550 |

A. One Hydrogen
a Iodoform.
b Pentabromoethane.
c 1,1,1,2,2,3,3-heptachloropropane.
B. Two Hydrogens
d 1,1,2,2-tetrachloroethane.
C. Six Hydrogens
e 1,2,3,4,5,6-hexachlorocyclohexane.
*Ethylene-propylene rubber, which contains about 49 mole percent propylene units and has an inherent viscosity of 5.7 as determined in decalin at 135° C.; prepared with $VCl_3/Al(C_6H_{13})_3$ complex catalyst.
†Ethylene-propylene rubber which contains about 37 mole percent propylene units and has an inherent viscosity of 4.4 as determined in tetralin at 135° C.; prepared with $VCl_3/Al(isobutyl)_3$ complex catalyst.

Example 17

In the following table it is shown that low pressure crystalline (isotactic) polypropylene may be cross linked with the use of sulfur and octachlorocyclopentene. The cross linked product contains gel while the non-cross linked polymer does not.

|  | A | B | C | D | E |
|---|---|---|---|---|---|
| Isotactic Polypropylene a | 100 | 100 | 100 | 100 | 100 |
| Sulfur | 0 | 1 | 0 | 0 | 1 |
| Zinc Oxide | 0 | 2 | 0 | 2 | 2 |
| OCCP b | 0 | 0 | 5 | 5 | 5 |
| Cure: 335° F./30'— |  |  |  |  |  |
| Tensile, p.s.i | 2,230 | cracked | cracked | 2,310 | 2,250 |
| Elongation, percent | 100 |  |  | ~0 | ~0 |
| Percent Gel d | 0 | 0 | 0 | 83.0 | 85.8 |
| [η] of Sol d | 1.83 | 2.82 | 2.64 | 0.33 | 0.11 | a Isotactic polypropylene—commercial polymer produced by low pressure process. I.V. in decalin at 135° C., 3.08.
b OCCP = Octachlorocyclopentene.
c Cured in micro pads and tested with Scott micro tensile machine.
d The gel was determined by heating the polymer in decalin (1 g./l.) at 135° C. for 1 hr. with a reflux condenser. The decalin solution was filtered hot over a 375 mesh screen: the gel was dried and the filtrate (sol) was run for viscosity.

Example 18

In the following table it is shown that low pressure, crystalline polyethylene may be cross linked with sulfur and octachlorocyclopentene.

|  | A | B | C | D | E | F |
|---|---|---|---|---|---|---|
| Polyethylene a | 100 | 100 | 100 | 100 | 100 | 100 |
| Sulfur | 0 | 1 | 0 | 0 | 1 | 1 |
| Zinc Oxide | 0 | 2 | 0 | 2 | 0 | 2 |
| OCCP b | 0 | 0 | 5 | 5 | 5 | 5 |
| Cure: 400° F./30'— |  |  |  |  |  |  |
| Tensile, p.s.i | 4,820+ | 3,260+ | 4,800 | 2,880+ | 5,120 | 2,260 |
| Elongation, percent | 500 | 450 | 550 | 100 | 550 | 100 |
| Cure c: 335° F./30'— |  |  |  |  |  |  |
| Tensile, p.s.i | 5,560 | 4,410 | 4,250 | 2,000 | 3,850 | 2,180 |
| Elongation, percent | 700 | 600 | 400 | <100 | 450 | 250 |
| Percent Gel d | 0 | 0 | 75.8 | 92.8 | 51.2 | 92.9 |
| [η] of Sol. d | 6.25 | 6.63 | 0.22 | (e) | 1.05 | (e) | a Low pressure crystalline polyethylene—Baton Rouge AMP Run #34; Density, 0.923; Soft Point, 132° C.; M.P., 185° C. Intrinsic Viscosity in decalin at 135° C., 2.50.
b OCCP = Octachlorocyclopentene.
c Cured in micro pads and tested with Scott micro tensile machine.
d The gel was determined by heating the polymer in decalin (1 g./l.) at 135° C. for 1 hr. with a reflux condenser. The decalin solution was filtered hot over a 375 mesh screen: The gel was dried and filtrate (sol) was run for viscosity.
e Indeterminate.

Example 19

In the following tables various curing agents of this invention are shown to cross link two crystalline polymers.

Agents used:
(a) hexachloroethane
(b) octachloropropane
(c) heptachloropropane
(d) octachlorocyclopentene
(e) iodoform

| Sample No. | 1 | 2 | 3 | 4 | 5 | 6 | 7 | 8 | 9 | 10 | 11 | 12 |
|---|---|---|---|---|---|---|---|---|---|---|---|---|
| Polyethylene [1] | 100 | 100 | 100 | 100 | 100 | 100 | 100 | 100 | 100 | 100 | 100 | 100 |
| Philblack O | None | None | None | None | None | None | 50 | 50 | 50 | 50 | 50 | 50 |
| Sulfur | 1 | 1 | 1 | 1 | 1 | 1 | 1 | 1 | 1 | 1 | 1 | 1 |
| $Fe_2O_3$ | 5 | 5 | 5 | 5 | 5 | 5 | 5 | 5 | 5 | 5 | 5 | 5 |
| Agent, 1765-150-A | None | (a) | (b) | (c) | (d) | (e) | None | (a) | (b) | (c) | (d) | (e) |
| Wt | None | 5 | 5 | 5 | 5 | 5 | None | 5 | 5 | 5 | 5 | 5 |
| Cure: 400° F./20'— | | | | | | | | | | | | |
| Tensile, p.s.i. yield | 792 | 1,219 | | | | N.C. | | | | | | 432 |
| Elong., percent yield | 50 | 23 | | | | | | | | | | 35 |
| Cure: 400° F./6'— | | | | | | | | | | | | |
| Tensile, p.s.i. yield | 3,063 | 2,778 | 2,405 | 1,448 | 2,514 | 2,377 | 1,096 | 1,400 | 1,576 | 1,382 | 1,821 | 1,611 |
| Elong, percent yield | 22 | 27 | 27 | 26 | 25 | 28 | 5 | 4 | 1 | 5 | 2 | 2 |
| Gel, percent [2] | 1.6 | 1.0 | 84.9 | 9.2 | 95.4 | 82.3 | 32.6 | 51.4 | 67.0 | 58.9 | 79.4 | 86.5 |
| Intrinsic Viscosity [3] | 2.1 | | | | | | | | | | | |

[1] Density, 0.9476; tensile at 2"/minute, 2,940 p.s.i. yield; elongation, 17% yield; melt index, 1.2.
[2] Determined in decalin at 135° C. at 1 g./l. for 1 hr.; filtered over a 375 mesh screen and dried.
[3] Determined in decalin at 135° C. at 0.5 g./l. for 1 hr.; filtered over 375 mesh screen and dried.

| Sample No. | 1 | 2 | 3 | 4 | 5 | 6 | 7 | 8 | 9 | 10 | 11 | 12 |
|---|---|---|---|---|---|---|---|---|---|---|---|---|
| Polypropylene [1] | 100 | 100 | 100 | 100 | 100 | 100 | 100 | 100 | 100 | 100 | 100 | 100 |
| Philblack O | None | None | None | None | None | None | 50 | 50 | 50 | 50 | 50 | 50 |
| Sulfur | 1 | 1 | 1 | 1 | 1 | 1 | 1 | 1 | 1 | 1 | 1 | 1 |
| $Fe_2O_3$ | 5 | 5 | 5 | 5 | 5 | 5 | 5 | 5 | 5 | 5 | 5 | 5 |
| Agent | None / None | (a) 5 | (b) 5 | (c) 5 | (d) 5 | (e) 5 | None / None | (a) 5 | (b) 5 | (c) 5 | (d) 5 | (e) 5 |
| Cure: 400° F./6'— | | | | | | | | | | | | |
| Tensile, p.s.i. yield | 3,675 | 3,514 | 700 | 863 | 1,470 | 1,141 | 1,281 | 728 | 1,034 | 1,397 | 694 | 178 |
| Elong., percent yield | 40 | 29 | 127 | 372 | 48 | 50 | 4 | 6 | 10 | 11 | 5 | 11 |
| Percent Gel [2] | 1.6 | 62.9 | 40.8 | 85.7 | 100 | 60.4 | 32.0 | 49.6 | 58.0 | 62.7 | 67.8 | |

[1] Isotactic low pressure polypropylene: density, 0.9102; tensile at 2"/minute, 4,480 p.s.i. yield; elongation, 17% yield; melt index, 0.36; intrinsic viscosity 3.08.
[2] Determined in decalin at 135° C. at 1 g./l. for 1 hr.; filtered through a 375 mesh screen and dried.

The advantages of this invention will be apparent to those skilled in the art. Cured polymers are provided of high tensile strength, having substantially no odor, and with improved physical characteristics. The cross linking agents herein disclosed have been found to cure not only unsaturated polymers but also polymers having no unsaturation at all.

This invention has been described in connection with certain specific embodiments thereof; however, it should be understood that these are by way of example rather than by way of limitation and it is not intended that the invention be restricted thereby.

What is claimed is:

1. A curable composition of matter comprising sulfur, $C_2$–$C_5$ alpha olefin hydrocarbon crystalline polymer and a polyhalocyclomonoalkene containing no more than one hydrogen atom and up to 20 ring carbon atoms wherein the halogen is selected from the class consisting of chlorine, bromine, and iodine.

2. The composition of claim 1 wherein the polymer is crystalline polypropylene.

3. The composition of claim 1 wherein the polymer is crystalline polyethylene.

4. The composition of claim 1 wherein the polyhaloaliphatic compound is octachlorocyclopentene.

5. The composition of claim 2 wherein the polyhaloaliphatic compound is octachlorocyclopentene.

6. The composition of claim 4 which additionally contains 1 to 200 parts of filler and 1 to 20 parts of zinc oxide per 100 parts of polymer.

7. A method for cross linking a $C_2$–$C_5$ alpha olefin hydrocarbon crystalline polymer which comprises
   (a) mixing said polymer with sulfur and a polyhaloaliphatic compound selected from the class consisting of:
      (1) $C_1$–$C_{20}$ polyhaloalkanes containing no more than one hydrogen atom wherein the halogen is selected from the class consisting of chlorine, bromine and iodine, and
      (2) polyhalocyclomonoalkenes containing no more than one hydrogen atom and from 3 to 20 ring carbon atoms wherein the halogen is selected from the class consisting of chlorine, bromine, and iodine, and
   (b) heating to a curing temperature.

8. The method of claim 7 wherein the polyhaloaliphatic compound is octachlorocyclopentene.

9. The method of claim 7 wherein the polyhaloaliphatic compound is a $C_1$–$C_{20}$ polyhaloalkane containing no more than one hydrogen atom wherein the halogen is selected from the class consisting of chlorine, bromine, and iodine.

10. The method of claim 8 wherein the polymer is crystalline polypropylene.

11. The method of claim 8 wherein the polymer is crystalline polyethylene.

References Cited

UNITED STATES PATENTS

| | | | |
|---|---|---|---|
| 3,012,996 | 12/1961 | McFarland | 260—33.8 |
| 3,012,020 | 12/1961 | Kirk et al. | 260—41 |
| 3,141,867 | 7/1964 | Smith | 260—94.9 |
| 3,227,664 | 1/1966 | Blades et al. | 260—33.8 |

MORRIS LIEBMAN, *Primary Examiner.*

J. S. WALDRON, K. B. CLARKE, *Assistant Examiners.*